United States Patent
Juopperi et al.

(10) Patent No.: US 7,324,645 B1
(45) Date of Patent: Jan. 29, 2008

(54) METHOD TO AUTHENTICATE A MOBILE STATION, A COMMUNICATIONS SYSTEM AND A MOBILE STATION

(75) Inventors: Jari Juopperi, Kirkkonummi (FI); Kari Kurronen, Irving, TX (US)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/399,288

(22) Filed: Sep. 17, 1999

(30) Foreign Application Priority Data

Sep. 18, 1998 (FI) .......................... 982012

(51) Int. Cl.
H04L 9/00 (2006.01)
H04L 9/12 (2006.01)

(52) U.S. Cl. ............... 380/247; 380/249; 713/168; 713/169; 713/170; 713/171; 726/17; 726/18; 726/19; 726/21

(58) Field of Classification Search ............... 380/247, 380/277, 278, 303; 713/168, 171; 455/410, 455/411, 456.1
See application file for complete search history.

(56) References Cited

U.S. PATENT DOCUMENTS

| | | | | |
|---|---|---|---|---|
| 5,216,715 A | | 6/1993 | Markwitz ............... 380/21 |
| 5,515,441 A | | 5/1996 | Faucher ............... 380/30 |
| 5,761,305 A | | 6/1998 | Vanstone et al. ............... 380/21 |
| 5,799,084 A | * | 8/1998 | Gallagher et al. ............... 380/248 |
| 5,809,141 A | * | 9/1998 | Dent et al. ............... 380/247 |
| 5,822,691 A | | 10/1998 | Hosseini ............... 455/410 |
| 5,887,251 A | * | 3/1999 | Fehnel ............... 455/411 |
| 5,943,425 A | * | 8/1999 | Mizikovsky ............... 380/247 |
| 5,970,144 A | * | 10/1999 | Chan et al. ............... 380/247 |
| 6,023,689 A | * | 2/2000 | Herlin et al. ............... 705/67 |

(Continued)

FOREIGN PATENT DOCUMENTS

| | | |
|---|---|---|
| DE | 195 21 484 A1 | 12/1996 |
| EP | 0 719 045 A3 | 6/1996 |
| WO | WO 98/34370 | 8/1998 |

OTHER PUBLICATIONS

1996 IEEE, pp. 1252-1256, 0-7803-3692-5/96, Chang, Tu and Chen.

(Continued)

*Primary Examiner*—Syed A. Zia
(74) *Attorney, Agent, or Firm*—Perman & Green, LLP

(57) ABSTRACT

A method to authenticate a mobile station B in a mobile network, so that the mobile station B is authenticated and an encryption key is agreed between mobile stations A and B using user data exchange during call setup. More specifically the mobile station B is authenticated by the mobile station A constructing and sending to the mobile station B a message $M_1$, the mobile station B receiving the message $M_1$, constructing and sending a message $M_2$ to the mobile station A, the mobile station A receiving the message $M_2$, checking the validity of the information in the message $M_2$, if the information is verified valid the mobile station A accepting to share a shared encryption key K with mobile station B, the mobile station A constructing and sending the message $M_3$ to the mobile station B, the mobile station B receiving the message $M_3$ and verifying the validity of the information, if the information is valid the mobile station B accepting the sharing of the shared encryption key K with the mobile station A.

14 Claims, 3 Drawing Sheets

U.S. PATENT DOCUMENTS 6,430,407 B1 *  8/2002  Turtiainen ............... 455/411
6,823,452 B1 * 11/2004  Doyle et al. ............ 713/156
6,944,283 B1 *  9/2005  Klein .................. 379/355.04

OTHER PUBLICATIONS

IEEE Network, Sep./Oct. 1997, pp. 50-55, 0890-8044/97, Chang-Seop Park.

"On Certificate-Based Security Protocols for Wireless Mobile Communication Systems" Chang-Seop Park, Sep. 1997-Oct. 1997.

Patent Abstracts of Japan 8307943, Nov. 22, 1996.

Patent Abstracts of Japan JP5167574, Feb. 7, 1993.

ETSI Digital Cellular Telecommunications System (Phase 2+); User-to-User Signalling (UUS); Service description, Stage 1 (GSM 02.87), unknown date.

* cited by examiner

METHOD TO AUTHENTICATE A MOBILE STATION, A COMMUNICATIONS SYSTEM AND A MOBILE STATION

BACKGROUND OF THE INVENTION

1. Field of the Invention

The present invention generally relates to a mobile station in a mobile network, and in particular to authenticating a mobile station in a mobile network.

2. Brief Description of Related Developments

Known authentication and key agreement protocols are based either on symmetric or public key cryptography and a trusted third party. In a Global System for Mobile Communication ("GSM"), the authentication and encryption key agreement is based on symmetric key and a trusted third party. The method using symmetric key requires the existence of an agreed secret between communicating parties or with a server as the third party. In GSM the mobile station of the subscriber shares a secret subscriber authentication key $K_i$ with a trusted authentication centre AC. The authentication of the mobile station is based on the use of a one-way function A3 and a ciphering key $K_c$ is derived from the shared $K_i$ in the mobile station and the authentication centre.

FIG. 1 shows a prior art authentication arrangement of GSM mobile networks, where there is an Authentication Centre AC 1, a Home Location Register HLR 2, Visitor Location Register VLR 3, Base Transmitter Station BTS 4 and Mobile Equipment ME 5, where number 6 is a Subscriber Identity Module SIM.

The method by the arrangement operates as follows: Authentication Centre 1 forms a Random Number RAND, that is used with subscriber authentication key $K_i$ to form an authentication triplet 7. The authentication triplet 7 comprises random number RAND directly from the RAND above, Signed Response SRES formed with a one-way function A3 1a from the subscriber authentication key $K_i$ and ciphering key $K_c$ formed with one-way function A8 1b from the RAND above. The authentication triplet 7 is sent to Home Location Register HLR 2 and then to Visitor Location Register VLR 3. The RAND of the authentication triplet 7 is sent from the VLR 3 to the Subscriber Identity Module SIM 6 in the Mobile Equipment ME 5 to form a key corresponding to the ciphering key $K_c$ in the same authentication triplet 7. The above key is formed by one-way function A8 6b in SIM 6 and processed more by one-way function A5 8 in ME 5 to exchange with the $K_c$ of the authentication triplet 7 processed by one-way function A5 8 in the Base Transmitter Station 4. Also subscriber authentication key $K_i$ of the SIM 6 is used to form a signed response corresponding to the SRES in the above authentication triplet 7 in the VLR 3. This signed response is directly sent to the VLR 3 to compare it with the SRES to complete the authentication.

Formerly is also known User-to-User Signalling (UUS) that is defined for Integrated Services Digital Network (ISDN) and is being defined for GSM network. The UUS is defined for GSM in ETSI (European Telecommunications Standards Institute) specification Digital cellular telecommunications system (Phase 2+); User-to-User Signalling (UUS); Service description, Stage 1 (GSM 02.87).

The UUS supplementary service allows the served subscriber to send to or receive from another user a limited amount of information. This information is generated by the subscriber and shall be passed transparently through the network. With the word transparently is meant that no modification to the contents is made. Normally the network does not interpret this information.

The served subscriber is able to send and receive User-to-User Information (UUI) in different phases of the call depending on what service subscriber uses. Possible services are:

Service 1: UUI can be sent and received during the origination and termination of a call, with UUI embedded within call control messages. The service 1 can be activated implicit by inserting UUI when set-up a call or explicit with an appropriate procedure.

Service 2: UUI can be sent and received after the served subscriber has received an indication that the remote party is being informed of the call and prior to the establishment of the connection. UUI sent by the served subscriber prior to receiving the acceptance of the call by the remote party, may as a network option be delivered to the remote party after the call has been established. The service 2 shall be activated explicitly.

Service 3: UUI can be sent and received only while the connection is established. The service 3 shall be activated explicitly.

Services 1 to 3 shall allow the transmission of UUI with the maximum length of 128 octets per message. In some networks as ISDN the maximum length is only 32 octets. The USER INFOrmation message between GSM mobile station and Mobile Switching Centre (MSC) can have 128 octets of user data while the messages for call setup and release can have 32 octets of user data. Messages for call setup and release include f.ex. SETUP, PROGRESS, ALERT, CONNECT, DISCONNECT, RELEASE, RELEASE COMPLETE.

A problem in the known arrangements in mobile networks is that only security parameters required in the establishment of confidentiality on the air interface are exchanged. Parameters for other information security features as integrity on air interface are not agreed.

A problem in the shared-key authentication and key agreement procedures is the agreed secret and in some circumstances needed connection to the trusted third party during the execution of the protocol.

The objective of the invention is to avoid disadvantages of the prior art solutions by bringing out a new authentication and key agreement for mobile communications systems to implement an end-to-end secure transmission.

In one aspect, the present is directed to authenticating a mobile station in a mobile network. In one embodiment the method includes authenticating the mobile station with user-to-user data exchange.

In another aspect, the present invention is directed to a cellular communications system including a first mobile station, a second mobile station and at least one mobile switching centre. In one embodiment the first and second mobile stations are wirelessly connected via base stations. The first mobile station constructs and sends a first message and receives and verifies the validity of a second message. When the information is verified as valid, the first mobile station accepts to share a shared encryption key K, and constructs and sends a third message. A second mobile station receives the first message and constructs and sends the second message. The second mobile station receives and verifies the validity of the third message, and when the information is determined to be valid, accepts to share the shared encryption key K with the first mobile station.

In a further aspect the present invention is directed to a mobile station. In one embodiment the mobile station includes a processor, a memory, an output means, an input means, a transmitter/receiver and an antenna. The processor performs operations needed to form and verify messages and implements authentication and key agreement procedures.

The procedures and messages, with necessary parameters and variables, are stored in the memory. The commencement of extra secure communications is presented to a user of the mobile station via the output means. The input means is used to enable validation of the extra secure communication and the transmitter/receiver and antenna transform information to radio waves from digital signals and vice versa.

SUMMARY OF THE INVENTION

The invention is directed to a method to authenticate a mobile station in a mobile network. According to the invention the mobile station is authenticated using user-to-user data exchange. This can be done during call setup or call.

In one embodiment of the method also an encryption key is agreed between mobile stations.

The invention is also directed to a cellular communications system, where the first and second mobile stations (A, B) are connected wireless with via base stations. According to the invention the cellular communications system comprises a first mobile station (A), that constructs and sends a first message ($M_1$), receives and verifies the validity of a second message ($M_2$) and when the information is verified valid accepts to share a shared encryption key K, constructs and sends a third message ($M_3$), a second mobile station (B), that receives the first message ($M_1$) and constructs and sends the second message ($M_2$), receives and verifies the validity of the third message ($M_3$) and when the information is valid accepts to share the shared encryption key K with the first mobile station (A), and at least one mobile switching centre.

The invention is also directed to a mobile station. According to the invention the mobile station comprises a processor to perform operations needed to form and verify messages ($M_1$, $M_2$, $M_3$), to implement authentication and key agreement procedures, a memory, where procedures and messages are stored with necessary parameters and variables, output means, on which commencement of extra secure communication is presented to a user of the mobile station, input means to enable validation of the extra secure communication, a transmitter/receiver and an antenna to transform information to radio waves from digital signals and vice versa.

An advantage of the invention is that the traffic between the communicating mobile stations is protected autonomously with public-key based authentication and key agreement mechanisms.

BRIEF DESCRIPTION OF THE DRAWINGS

The invention is described in detail in the following by referring to the appending drawing, where.

DETAILED DESCRIPTION OF THE PREFERRED EMBODIMENT(S)

Figure 1:
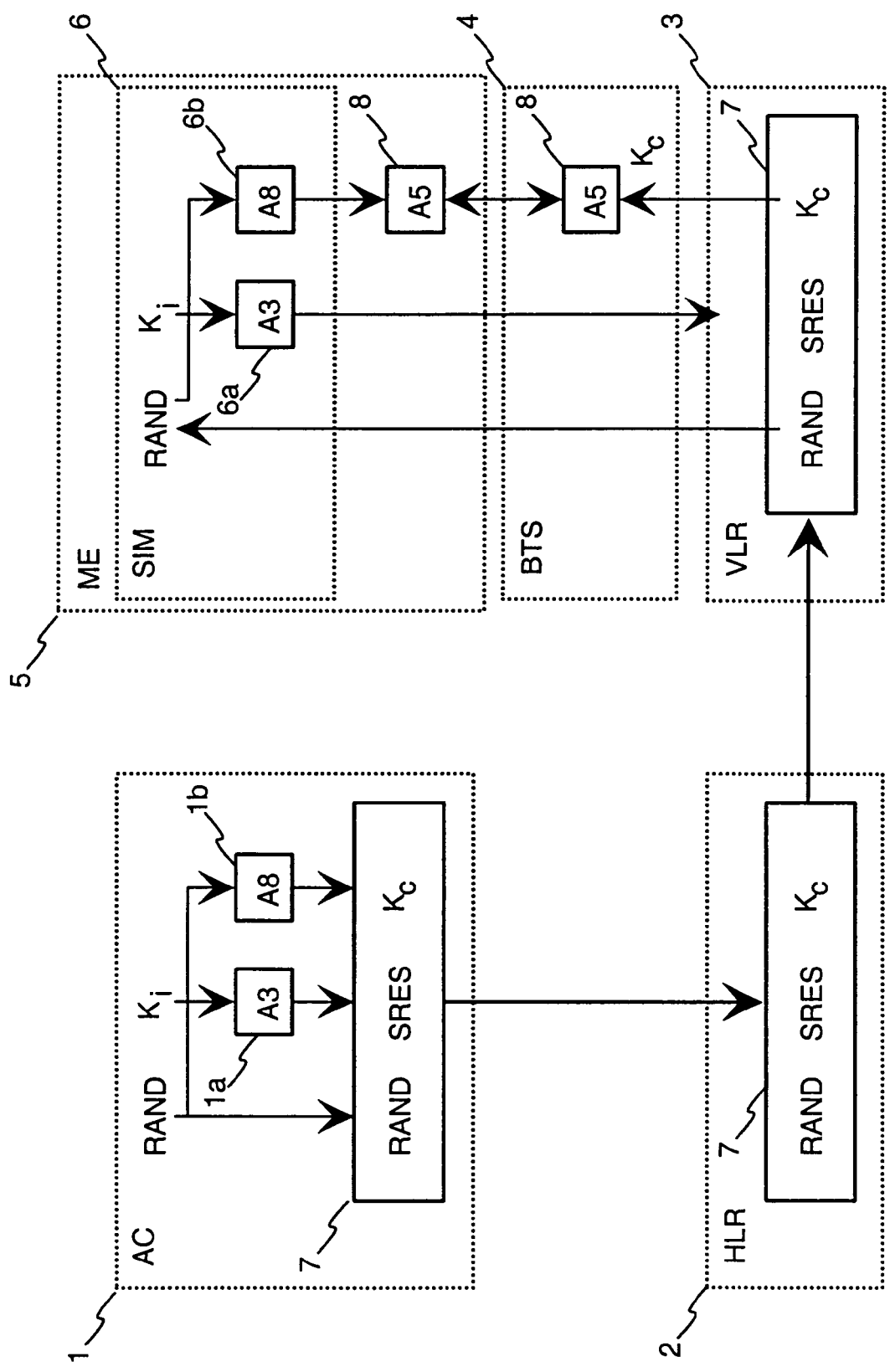
FIG. 1 presents a prior art arrangement in a flow chart.

FIG. 1 is described in the prior art portion of the text.

Figure 2:
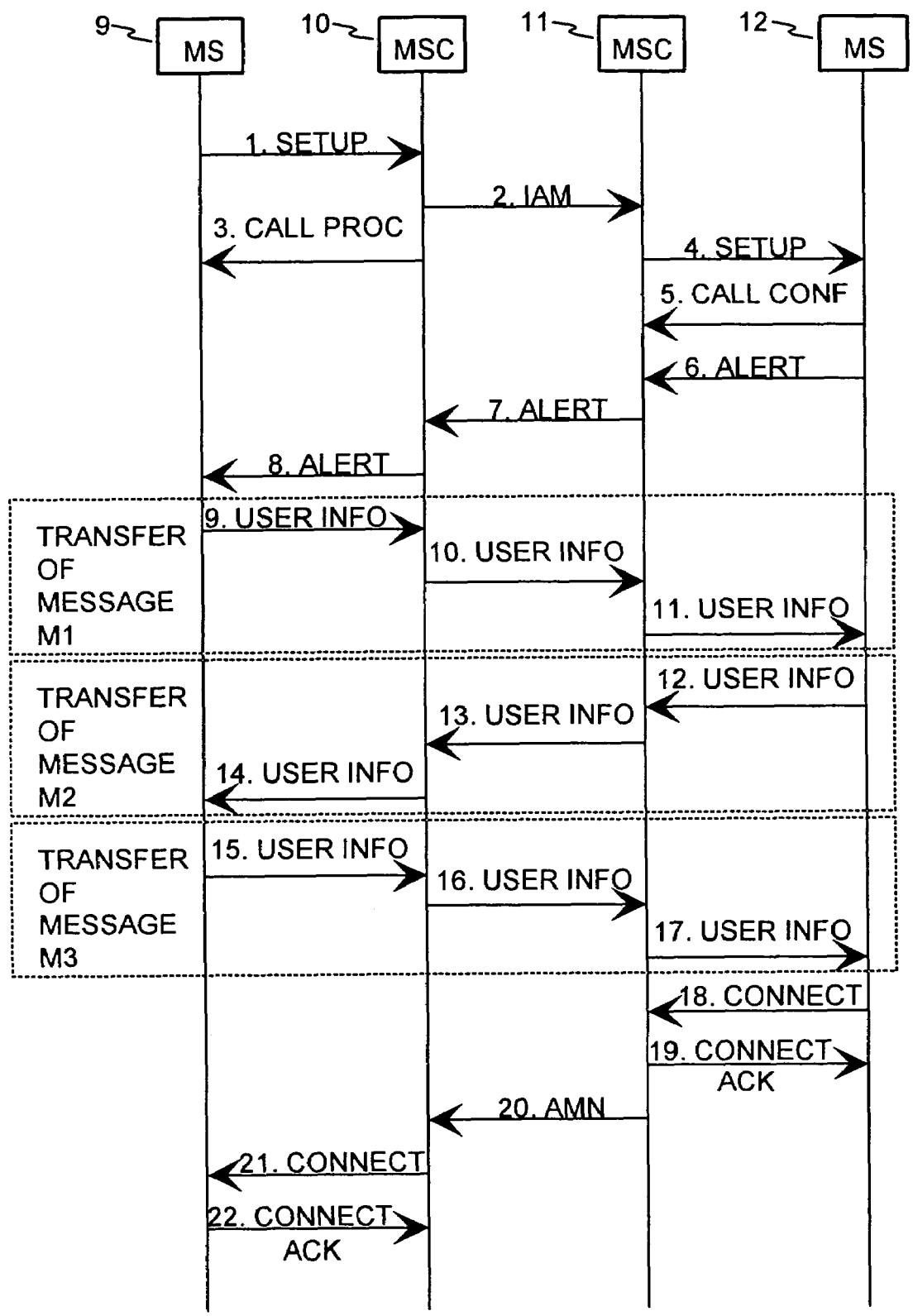
FIG. 2 presents a method of the invention in a signalling diagram.

FIG. 2 shows an authentication and key agreement protocol. The protocol is started when an input is given to trigger extra secure transmission. The parenthesis after the name of the message contain the name of the part of the message where the carried information is included and the name of the information. First the calling mobile station (MS) 9 sends a SETUP(UUS(service code)) message to the first Mobile Switching Centre (MSC) 10. The SETUP message contains in a User-to-User Information (UUI) element a service code indicating the encryption key management service encoded by the calling mobile station 9. The UUI element is transferred with the User-to-User Signalling (UUS). The first MSC 10 sends the user-to-user information via the Integrated Service Digital Network (ISDN) User Part (ISUP) signalling in an Initial Address Message (IAM) (UUS(service code)) to the second MSC 11 to which the called mobile station 12 is connected. This signalling between two MSCs 10, 11 is only needed when the two mobile stations 9, 12 are connected to different MSCs 10,11. The first MSC 10 responds to the calling mobile station 9 with a CALL PROCeeding message and the second MSC 11 sends a SETUP(UUS(service code)) message formed by the data from the first SETUP message to the called mobile station 12. Now the mobile station informs the user about an extra secure call. The called mobile station 12 responds to the second MSC 11 with a CALL CONFirmed and an ALERT(UUS(service acc.)) message meaning that the terminal equipment is alerting the subscribed user. Information whether the called mobile station 12 accepts the extra secure communication is delivered in the ALERT message. The ALERT message is led to the calling mobile station 9 to inform the alerting and the possible acceptance. The information is transferred if needed between two MSCs 11, 10 in an ISUP Answer Message (ANM). In case the extra secure communication is not applied preferably a normal call setup is continued or the call setup is aborted. This can be commenced by a decision of the user or of the logic of the mobile station 9 or of the logic of the MSC 10.

If the extra secure communication is accepted the service, the authentication and the key agreement protocol related information is exchanged between the two mobile stations 9, 12 in the USER INFOrmation message of GSM and ISUP. First the USER INFO(UUS($M_1$)) message is transferred from the calling mobile station 9 through MSCs 10, 11 to the called mobile station 12. Then the USER INFO(UUS($M_2$)) message is transferred from the called to the caller and the USER INFO(UUS($M_3$)) message is transferred from the caller to the called. If one or more of the messages $M_1$, $M_2$, $M_3$ is longer than the space in one USER INFO message carrier several USER INFO messages are used for transportation.

At last, during the call setup the called mobile station 12 sends a CONNECT(UUS(data)) message to the MSC 11 it is connected with. And the MSC 11 responds with a CONNECT ACKnowledgement message to the called mobile station 12. Then if needed the MSC 11 sends an AMN(UUS (data)) message to another MSC 10. The MSC 10 connected with the calling mobile station 9 sends a CONNECT(UUS (data)) message to the calling mobile station 9 and receives a CONNECT ACKnowledgement message. If User-to-User Signalling data UUS(data) is not needed at this stage plain CONNECT and AMN messages or messages with empty UUS(data) fields are used. It is possible to transfer more User-to-User Information now after the call is connected. The encryption algorithms can be applied to this information.

Alternatively, the security parameters can be exchanged after call setup during the call. In this option the call can be setup normally. When either subscriber wants to start extra secure communication during the conversation or data exchange, the subscriber initiates the secure communications e.g. by pressing the keys of the keyboard and the security parameters are exchanged using User-to-User Signalling.

Figure 3:
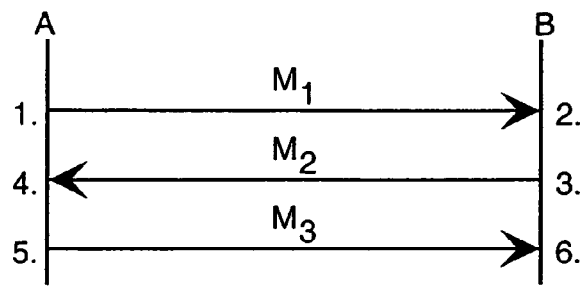
FIG. 3 presents a signalling diagram of an authentication and key agreement protocol.

FIG. 3 shows a signalling diagram of one authentication and key agreement protocol that can be used in the inventive method. The messages $M_1$, $M_2$, $M_3$ are shown without reference to the User-to-User Signalling (UUS) that the transmission is based on. The references A and B cite to the mobile stations in this station-to-station protocol. The references 1. to 6. cite to the steps performed while progressing. Subscribers A and B need an agreement on a key for extra secure connection. The protocol works followingly:

In step 1 the subscriber A initiates the protocol and selects a prime number p, a generator a of the multiplicative group of integers modulo p when $p \geq a \geq 2$ and a random secret x when $p-2 \geq x \geq 1$. Then A constructs and sends to B the message $M_1$ containing $$a, p, a^x \bmod p.$$

In step 2 the subscriber B receives the message $M_1$ and afterwards generates a secret y when $p-2 \geq y \geq 1$ and computes a shared key $K=(a^x)^y \bmod p$. Then B signs the concatenation of exponentials $\{a^y, a^x\}$ and encrypts the result $S_B\{a^y, a^x\}$ with the shared key leading to $E_K(S_B\{a^y, a^x\})$. B constructs and sends the message $M_2$ to A in step 3 containing $$a^y \bmod p, cert_B, E_K(S_B\{a^y, a^x\}).$$

Certificate $cert_B$ in the message $M_2$ contains the signature verification key of the subscriber B. The exact contents of the certificate may differ from the following minimum $$cert_B = (B, p_B, a, p, S_T\{B, p_B, a, p\}),$$

where $p_B$ is the public signature verification key of the subscriber B and $S_T$ is the signature transformation of a trusted authority T whose public signature verification key is known by A and B.

In step 4 the subscriber A receives the message $M_2$ and afterwards computes the shared encryption key $(a^y)^x \bmod p = (a^x)^y \bmod p = K$. The validity of the certificate $cert_B$ is checked by the subscriber A. When the certificate $cert_B$ is valid the encrypted part $E_K(S_B\{a^y, a^x\})$ of the message $M_2$ is decrypted to receive $S_B\{a^y, a^x\}$ and the signature $S_B\{a^y, a^x\}$ is verified with the public signature verification key $p_B$ of the subscriber B. If the signature is verified valid A accepts to share the shared encryption key K with B. If the signature is invalid the execution of the protocol is cancelled by A.

In step 5 the subscriber A signs the concatenation of exponentials $\{a^x, a^y\}$ and encrypts the result $S_A\{a^x, a^y\}$ with the shared key leading to $E_K(S_A\{a^x, a^y\})$. A constructs and sends the message $M_3$ to B in step 5 containing $$cert_A, E_K(S_A\{a^x, a^y\}),$$

where $cert_A$ includes corresponding information with $cert_B$ of the subscriber A. The exact contents of the certificate $cert_A$ may differ from the following minimum $$cert_A = (B, p_A, a, p, S_T\{B, p_A, a, p\}),$$

where $p_A$ is the public signature verification key of the subscriber A and $S_T$ is the signature transformation of a trusted authority T whose public signature verification key is known by A and B.

In step 6 the subscriber B receives the message $M_3$ and verifies the validity of the $cert_A$, decrypts $E_A(S_A\{a^x, a^y\})$ and verifies the validity of the signature of $S_A\{a^x, a^y\}$. If all the signatures are valid B accepts sharing of K with A. If any of the signatures is invalid B cancels the execution of the protocol.

Also other public key based authentication and key agreement protocols than the above presented station-to-station protocol can be used.

Figure 4:
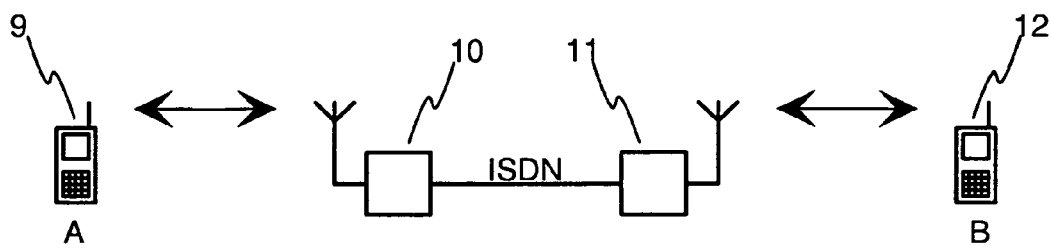
FIG. 4 presents communication system of the invention.

In FIG. 4 a communications system according to the invention is shown. The mobile station 9 of the subscriber A is connected wireless to a base transmitter station BTS that is connected wired to a base station controller BSC and to a mobile switching centre MSC 10. The MSCs 10, 11 are connected with an ISDN network together. The MSC 11 and BTS are connected wired and the BTS is connected wireless to the mobile station 12 of the subscriber B. Here only the MSCs 10, 11 are shown to present the logic of the invention. In reality the BTSs and the BSCs are also present.

Figure 5:
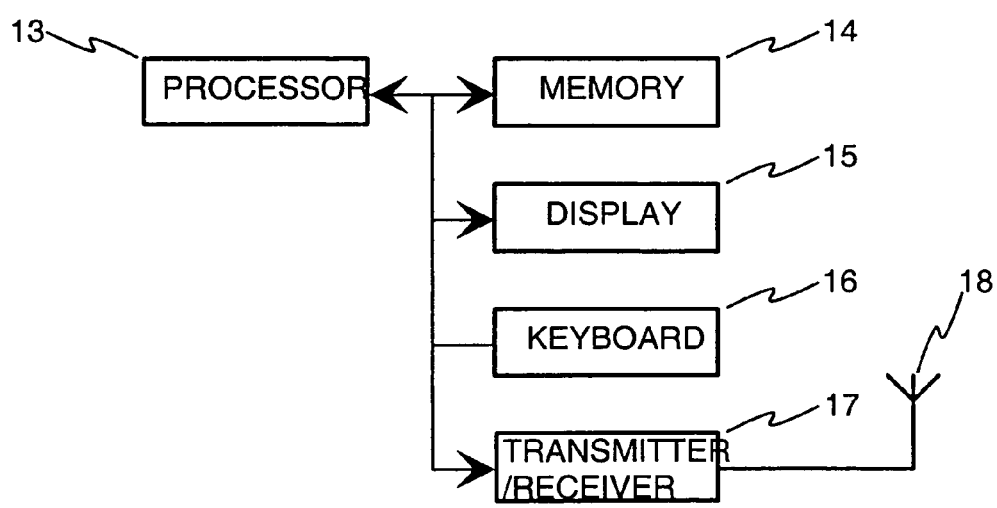
FIG. 5 presents essential parts of mobile station according to the invention in a block diagram.

In FIG. 5 a block diagram of the essential hardware needed to implement a mobile station according to the invention is described. The processor 13 perform the operations needed to implement the authentication and key agreement procedures from the memory 14 where they are stored with necessary parameters and variables. The commencement of extra secure communication is presented on the display 15 to the user of the mobile station. The validation of the service is done by pushing keys on the keyboard 16 or by processor 13. The transmitter/receiver 17 and antenna 18 is used to transform the information transmitted on radio waves from digital signals and vice versa.

The following example is presented to explain details of the invention when there are two different mobile switching centres connected with ISDN network together. User-to-User Signalling is used to transfer messages for station-to-station authentication and key agreement protocol described above. First the calling mobile station 9 encodes a service code indicating the encryption key management service to the user-to-user information element of the SETUP message and the mobile station 9 sends the message to the Mobile Switching Centre (MSC) 10. Then the User-to-User Information (UUI) is transferred using the ISDN User Part (ISUP) signalling to the MSC 11 where the mobile station of the called subscriber 12 is connected if the subscribers are connected to different MSCs 11. The UUI is transferred to the mobile station 12 of the called subscriber in the SETUP message. If the extra secure communication service defined in the UUI is recognized in the mobile station 12, the called subscriber is alerted preferably with a sound and textual or symbolical way of the service. The user have to allow or refuse the service in concern. Information of allowance or refusal of the service is transferred in an ALERT message from the mobile station 12 to the mobile switching centre 11. The UUI is transferred to the mobile station 9 of the calling subscriber preferably in an ISUP Answer Message (ANM) between the MSCs and in the ALERT message on the GSM connection. The calling subscriber is informed of the allowance or refusal of the extra secure communication service. If the called subscriber allowed the use of the service the authentication and key agreement protocol related information is exchanged between the two mobile stations using the USER INFO messages of GSM and ISDN. If the service is refused the call will be setup normally without the extra secure feature or the call will be terminated by user input without further setting up. The messages $M_1$, $M_2$, $M_3$ are then exchanged as described in detailed descriptions of FIGS. 2 and 3 above. Additional UUI information is transferrable between the mobile stations when the call is set up.

The extra secure communication can be initiated at least in three different ways followingly: 1. The user press a key or gives a voice command or gives an activation code before dialling a call, 2. A call to a subscriber on a list is made, and 3. The user chooses the feature from a menu to be on or off for a longer time. When the call is made the ability of the called mobile station to execute the required procedures is checked.

The examples described above are based on the use of the station-to-station protocol. The UUS signalling mechanism can be used to transport messages related to any other public key authentication and key agreement mechanism. It is also possible to use the UUS signalling mechanism to transport the messages of the shared-key technology based key agreement mechanisms.

The method of the invention can be used also in other networks that have a signalling mechanism between terminal equipment.

What is claimed is:

1. A method to authenticate a mobile station in a mobile network comprising:
   authenticating the mobile station with user-to-user data exchange;
   exchanging authentication data during call set-up or during a call;
   wherein an encryption key is agreed between two mobile stations and the mobile stations execute a mutual authentication and key agreement protocol based on public-key cryptography and,
   wherein a second mobile station is authenticated by:
   a first mobile station constructing and sending to the second mobile station a first message, the second mobile station receiving the first message,
   constructing and sending a second message to the first mobile station,
   the first mobile station receiving the second message, checking the validity of the information in the second message, if the information is verified valid the first mobile station accepting to share a shared encryption key K with the second mobile station, the first mobile station constructing and sending a third message to the second mobile station,
   the second mobile station receiving the third message and verifying the validity of the information, if the information is valid the second mobile station accepting the sharing of the shared encryption key K with the first mobile station.

2. A method according to claim 1 further, comprising:
   forming and verifying messages for implementation of authentication of the mobile station with user-to-user data exchange during call set up or during a call, and key agreement procedures;
   outputting for a presentation a commencement of extra secure communication services to a user of the mobile station;
   validating an extra secure communication channel for the extra secure communication services; and
   transmitting/receiving information as transformed to radio waves from digital signals and vice versa.

3. A method to authenticate a mobile station in a mobile network comprising:
   authenticating the mobile station with user-to-user data exchange;
   an encryption key is agreed between two mobile stations;
   the two mobile stations execute a mutual authentication and key agreement protocol based on public key cryptography;
   the second mobile station is authenticated by:
   a first mobile station constructing and sending to the second mobile station a first message, the second mobile station receiving the first message,
   constructing and sending a second message to the first mobile station,
   the first mobile station receiving the second message, checking the validity of the information in the second message, if the information is verified valid the first mobile station accepting to share a shared encryption key K with the second mobile station, the first mobile station constructing and sending a third message to the second mobile station,
   the second mobile station receiving the third message and verifying the validity of the information, if the information is valid the second mobile station accepting the sharing of the shared encryption key K with the first mobile station,
   the second mobile station is authenticated by the first mobile station selecting a prime number p, a generator a of a multiplicative group of integers modulo p when $p \geq a \geq 2$ and a random secret x when $p-2 \geq x \geq 1$ constructing and sending to the second mobile station the first message containing $$a, p, a^x \bmod p,$$

the second mobile station receiving the first message and afterwards generating a secret y when $p-2 \geq y \geq 1$ and computing a second shared key $K_2 = (a^x)^y \bmod p$, signing a concatenation of exponentials $\{a^y, a^x\}$ and encrypting a result $S_B\{a^y, a^x\}$ with the second shared key leading to $E_K(S_B\{a^y, a^x\})$, constructing and sending the second message to the first mobile station containing $$a^y \bmod p, cert_B, E_K(S_B\{a^y, a^x\}),$$

certificate $cert_B$ in the second message containing a signature verification key of the second mobile station, the exact contents of the certificate being of at least the following minimum $$cert_B = (B, p_B, a, p, S_T\{B, p_B, a, p\}),$$

$P_B$ being a public signature verification key of the mobile station B and $S_T$ a signature transformation of a trusted authority T whose public signature verification key is known in the first and second mobile stations, the first mobile station receiving the second message and afterwards computing a first shared encryption key $(a^y)^x \bmod p = (a^x)^y \bmod p = K_1$, checking the validity of the certificate $cert_B$ the first mobile station, when the certificate $cert_B$ is valid the encrypted part $E_K(S_B\{a^y, a^x\})$ of the second message is decrypted to receive a signature $S_B\{a^y, a^x\}$ and the signature $S_B\{a^y, a^x\}$ is verified with a public signature verification key $p_B$ of the second mobile station, if the signature $S_B\{a^y, a^x\}$ is verified valid the first mobile station accepts to share the shared encryption key $K_1$ with the second mobile station, the first mobile station signing a concatenation of exponentials $\{a^x, a^y\}$ and encrypting result $S_A\{a^x, a^y\}$ with the first shared key $K_1$ leading to $E_K(S_A\{a^x, a^y\})$, the first mobile station constructing and sending the third message to the second mobile station containing $$cert_A, E_K(S_A\{a^x, a^y\}),$$

cert$_A$ including corresponding information with cert$_B$ of the first mobile station, exact contents of the certificate cert$_A$ being at least of the following minimum $$cert_A = (B, p_A, a, p, S_T\{B, p_A, a, p\}),$$

P$_A$ being a public signature verification key of the first subscriber and S$_T$ a signature transformation of a trusted authority T whose public signature verification key is known by the first and second mobile stations, the second mobile station receiving the third message and verifying validity of the cert$_A$, decrypting E$_A$(S$_A$\{a$^x$, a$^y$\}) and verifying validity of signature of S$_A$\{a$^x$, a$^y$\}, if all the signatures are valid the second mobile station accepting sharing of the second shared encryption key K$_2$ with the mobile station.

4. A cellular communications system, where the first and second mobile stations are wireless connected with via base stations, wherein the system comprises
   a) a first mobile station, authenticated with user-to-user data exchange during call set up or during a call, that constructs and sends a first message, receives and verifies the validity of a second message and when the information is verified valid accepts to share a shared encryption key K, constructs and sends a third message,
   b) a second mobile station, that receives the first message and constructs and sends the second message, receives and verifies the validity of the third message and when the information is valid accepts to share the shared encryption key K with the first mobile station, and
   c) at least one mobile switching centre.

5. A communications system according to claim 4, wherein the system comprises two mobile switching centres connected together with ISDN.

6. A mobile station, wherein the mobile station comprises:
   a) a processor to perform operations needed to form and verify messages, to implement authentication of the mobile station with user-to-user data exchange during call set up or during a call, and key agreement procedures,
   b) a memory, where procedures and messages are stored with necessary parameters and variables,
   c) output means, on which commencement of extra secure communication is presented to a user of the mobile station,
   d) input means to enable validation of the extra secure communication,
   e) a transmitter/receiver and an antenna to transform information to radio waves from digital signals and vice versa.

7. A mobile station according to claim 6, wherein the output means comprises a display.

8. A mobile station according to claim 6, wherein the input means comprises a keyboard.

9. A mobile station according to claim 6, wherein the mobile station is designed to GSM standards.

10. A mobile station according to claim 6, wherein the mobile station is designed to UTMS standards.

11. A method to authenticate a mobile station in a mobile network, wherein a first mobile station and a second mobile station are wirelessly connected with via base stations, comprising:
    authenticating the first mobile station with user-to-user data exchange during call set up or during a call;
    constructing and sending a first message by the first mobile station;
    receiving the first message by the second mobile station;
    constructing and sending by the second mobile station, a second message;
    receiving and verifying by the first mobile station, a validity of the second message;
    accepting to share when information is verified valid in the first mobile station, a shared encryption key K;
    constructing and sending by the first mobile station, a third message;
    receiving and verifying by the second mobile station, a validity of the third message; and
    accepting to share, when information is verified valid in the second mobile station, a shared encryption key K.

12. A method according to claim 11, wherein authentication data is exchanged through user-to-user signaling.

13. A method according claim 11 comprising exchanging authentication data through user-to-user signaling during a call requiring extra secure communication services.

14. A method according to claim 11, wherein the first and second mobile stations execute a mutual authentication and key agreement protocol based on public-key cryptography.

* * * * *